(12) United States Patent
Kim et al.

(10) Patent No.: US 11,269,328 B2
(45) Date of Patent: Mar. 8, 2022

(54) METHOD FOR ENTERING MOBILE ROBOT INTO MOVING WALKWAY AND MOBILE ROBOT THEREOF

(71) Applicant: LG ELECTRONICS INC., Seoul (KR)

(72) Inventors: Nakyeong Kim, Seoul (KR); Sungmin Moon, Seoul (KR); Sanghak Lee, Seoul (KR); Jeongkyo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 16/539,609

(22) Filed: Aug. 13, 2019

(65) Prior Publication Data
US 2019/0369622 A1    Dec. 5, 2019

(30) Foreign Application Priority Data

Jun. 28, 2019 (KR) .................. 10-2019-0077644

(51) Int. Cl.
*G05D 1/00* (2006.01)
*B66B 29/08* (2006.01)
*B66B 25/00* (2006.01)

(52) U.S. Cl.
CPC ......... *G05D 1/0088* (2013.01); *B66B 25/003* (2013.01); *B66B 29/08* (2013.01); *G05D 2201/02* (2013.01)

(58) Field of Classification Search
CPC .. G05D 1/0088; G05D 2201/02; B66B 29/08; B66B 25/003
See application file for complete search history.

(56) References Cited

U.S. PATENT DOCUMENTS

| | | | |
|---|---|---|---|
| 2014/0107868 A1* | 4/2014 | DiGiacomcantonio .. | A45C 5/14 701/2 |
| 2019/0176333 A1* | 6/2019 | Hager, IV ............ | G05D 1/0219 |
| 2019/0261131 A1* | 8/2019 | Keil ...................... | H04W 68/04 |
| 2020/0000193 A1* | 1/2020 | Qi ......................... | G05D 1/0016 |

(Continued)

FOREIGN PATENT DOCUMENTS

JP    2017021570 A    *   1/2017

OTHER PUBLICATIONS (Author not mentioned) DTE "Escalators and Moving Walkways" accessible at https://dteenergy.bizenergyadvisor.com/article/escalators-and-moving-walkways, published Jan. 3, 2018 (Year: 2018).*

(Continued)

*Primary Examiner* — Peter D Nolan
*Assistant Examiner* — Tanya C Sienko
(74) *Attorney, Agent, or Firm* — Birch, Stewart, Kolasch & Birch, LLP

(57) ABSTRACT

The present invention is directed to a method of causing a mobile robot to enter a moving walkway, the method including setting a movement path including a moving walkway, recognizing, by the mobile robot, to enter the moving walkway included in the movement path, adjusting at least one of a speed of the mobile robot and a speed of a step belt of the moving walkway via communication between the mobile robot and the moving walkway, and moving the mobile robot onto the step belt of the moving walkway based on the adjusted speed.

13 Claims, 9 Drawing Sheets

(56) References Cited

U.S. PATENT DOCUMENTS

2020/0039754 A1* 2/2020 Vuorenala ............... B66B 1/468

OTHER PUBLICATIONS

Hirota, K. et al. "Development of an escalator riding robot: Experiment of riding on an up escalator" 2014 IEEE International Conference on Automation Science and Engineering (CASE) Taipei, Taiwan, Aug. 18-22, 2014 pp. 1206-1211 (Year: 2014).*

"How a Guide Robot Should Behave at an Airport—Insights Based on Observing Passengers" M.P. Joosse, M.Lohse, V. Evers, University of Twente . . . Accessed at https://research.utwente.nl/en/publications/how-a-guide-robot-should-behave-at-an-airport-insights-based-on-o (Year: 2015).*

* cited by examiner

METHOD FOR ENTERING MOBILE ROBOT INTO MOVING WALKWAY AND MOBILE ROBOT THEREOF

CROSS-REFERENCE TO RELATED APPLICATION

This application claims the benefit of Korean Patent Application No. 10-2019-0077644, filed on Jun. 28, 2019, in the Korean Intellectual Property Office, the disclosure of which is incorporated herein in its entirety by reference.

BACKGROUND

1. Field

The present disclosure relates to a method of causing a movable mobile robot to enter a moving walkway and a mobile robot that performs the method.

2. Description of the Related Art

Various industrial robots for use in medical, aerospace, shipbuilding, and agricultural industries, for example, have been manufactured and operated. In recent years, in addition to a robot configured to perform only simple repetitive operations in place, a mobile robot capable of implementing a predetermined function while moving along with a user has been widely utilized to directly communicate with the user and provide user convenience.

Accordingly, a mobile robot capable of moving while carrying out various operations has been widely utilized not only at home but also in places where a large number of people gather to individually perform various tasks or get guide services (for example, an airport, a building lounge, and locations for events).

In the case in which a mobile robot moves along a predetermined path in order to perform a predetermined operation in the places mentioned above, the mobile robot is capable of searching for an optimal path using acquired map information. Thus, a user can move along with the mobile robot as needed to perform the predetermined operation. For example, when the user wishes to be guided for a movement path to a specific location within a wide place, the mobile robot may guide the user the movement path.

In this manner, the mobile robot may provide the user with a function of showing an optimal path in a predetermined place. However, since the mobile robot may have difficulty in using various transport devices (for example, a moving walkway and an escalator) available to the user according to the driving characteristics thereof, path guidance in consideration of positions of these transport devices may be difficult.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

The present disclosure is devised to provide a method for allowing a mobile robot to guide a user an optimal movement path in consideration of not only the ground which does not move but also a movement path in which various transport devices available to a user are provided and a mobile robot for the same.

The present disclosure is devised to provide a method for allowing a mobile robot to stably enter a transport device in a path guidance process of guiding a user a movement path and a mobile robot for the same.

The present disclosure is devised to provide a method for allowing a mobile robot to stably leave a transport device and a mobile robot for the same.

The present disclosure is devised to provide an optimal method for allowing a mobile robot to enter a transport device without passenger inconvenience and to move rapidly based on whether or not a passenger has already been in the transport device.

The present disclosure is not limited to the above-mentioned objectives, and other unmentioned objectives of the present disclosure may be easily understood by those skilled in the art from various embodiments of the present disclosure, which will be described later. In addition, it will be readily apparent that the objectives and advantages of the present disclosure may be realized by devices defined in the claims and combinations thereof.

In order to address the above-described technical solutions, according to one embodiment, there is provided a method for a mobile robot to enter a moving walkway including setting a movement path including a moving walkway, recognizing that a mobile robot enters the moving walkway included in the movement path, adjusting at least one of a speed of the mobile robot and a speed of a step belt of the moving walkway via communication between the mobile robot and the moving walkway, and moving the mobile robot onto the step belt of the moving walkway based on the adjusted speed.

In order to address the above-described technical solutions, according to another embodiment, there is provided a mobile robot including a communication unit configured to communicate with a moving walkway, and a processor configured to set a movement path including the moving walkway, to recognize that the mobile robot enters the moving walkway included in the movement path, to adjust at least one of a speed of the mobile robot and a speed of a step belt of the moving walkway via communication between the mobile robot and the moving walkway, and to move the mobile robot onto the step belt of the moving walkway based on the adjusted speed.

In order to address the above-described technical solutions, according to a further embodiment, there is provided a non-transitory computer readable recording medium including a computer program for performing a method for a mobile robot to enter a moving walkway.

According to an embodiment of the present disclosure, a mobile robot may provide a user with an optimal movement path actually available to the user among paths in which various transport devices available to the user are provided.

According to an embodiment of the present disclosure, it is possible to allow a mobile robot to stably enter a transport device without losing the balance thereof and without creating anxiety of people around the mobile robot.

According to an embodiment of the present disclosure, it is possible to allow a mobile robot to stably leave a transport device.

According to the present disclosure, by determining whether or not a passenger has already been in a transport device before a mobile robot enters the transport device, it is possible to prevent the passenger from feeling uncomfortable due to a change in the speed of the transport device and to allow the mobile robot to move in the transport device at a high speed when no passenger is present in the transport device.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
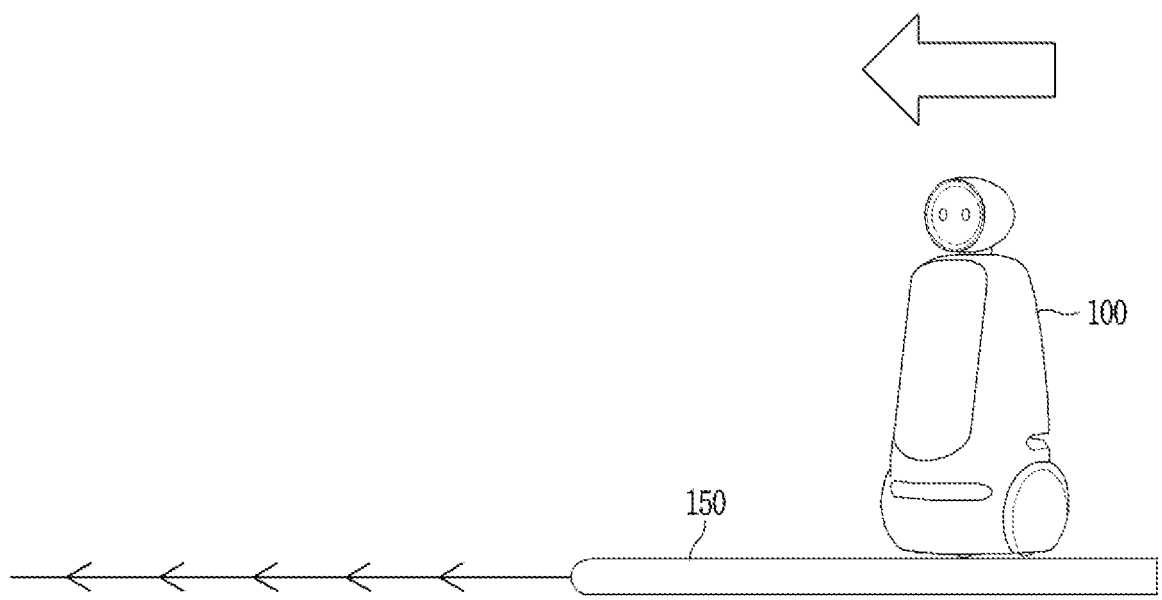
FIG. 1 illustrates the situation in which a mobile robot enters a moving walkway according to an embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the drawings so that those skilled in the art can easily carry out the present disclosure. The present disclosure may be embodied in many different forms and is not limited to the embodiments described herein.

With respect to constituent elements used in the following description, suffixes "module" and "unit" are given or mingled with each other only in consideration of ease in the preparation of the specification, and do not have or serve as different meanings.

In order to clearly describe the present disclosure, elements having no connection with the description are omitted, and the same or extremely similar elements are designated by the same reference numerals throughout the specification. In addition, some embodiments of the present disclosure will be described in detail with reference to exemplary drawings. When adding reference numerals to constituent elements of the respective drawings, it should be noted that the same or similar elements are denoted by the same reference numerals even though they are depicted in different drawings. In addition, in the following description of the present disclosure, a detailed description of known functions and configurations incorporated herein will be omitted when it may make the subject matter of the present disclosure rather unclear.

In addition, it will be understood that the terms first, second, A, B, (a), and (b), for example, may be used herein to describe various elements according to the embodiments of the present disclosure. These terms are only used to distinguish one element from another element and, thus, are not intended to limit the essence, order, sequence, or number of elements. It will be understood that, when any element is referred to as being "connected to" "coupled to", or "joined to" another element, it may be directly on, connected to or coupled to the other element or intervening elements may be present.

It will be further understood that the terms "comprises" "comprising" "includes" and/or "including" when used in this specification, specify the presence of stated features, integers, steps, operations, elements, and/or components, but do not preclude the presence or addition of one or more other features, integers, steps, operations, elements, and/or components.

In addition, for convenience of description, the present disclosure may be embodied by subdividing constituent elements, but these constituent elements may be embodied in a single device or module, or one constituent element may be divided into multiple devices or modules.

Prior to describing various embodiments of the present disclosure, key terms will be described as follows.

The term "robot" may refer to a machine that automatically operates or performs a given operation by abilities thereof. In particular, a robot that functions to recognize an environment and perform a motion based on self-determination may be referred to as an intelligent robot. Robots may be classified into industrial, medical, household, and military robots, for example, according to the purpose of use or the field of use thereof. According to an embodiment, a mobile robot may be defined as a robot that has the ability to move by itself and is capable of moving to perform a predetermined function.

The term "moving walkway" refers to one of transport devices on which a user or a robot can ride and move. The user or the robot needs to move horizontally in order to ride on the moving walkway, and once ridden on the moving walkway, the user or the robot can be moved in a direction parallel to or obliquely to the ground. According to an embodiment, the moving walkway may be referred to as an autowalk, a moving sidewalk, a moving pavement, a people-mover, a travolator or a travelator, and may conceptually include a transport device such as an escalator.

The term "step belt" refers to one constituent element of the moving walkway. The step belt is a predetermined moving structure for continuously moving a person or an object on the moving walkway, and may receive movement force from, for example, a step belt roller or a drive device connected thereto. According to an embodiment, the robot or a passenger can move onto the step belt of the moving walkway to continuously move along with the step belt.

The term "artificial intelligence (AI)" refers to the field of studying artificial intelligence or a methodology capable of making the artificial intelligence, and the term "machine learning" refers to the field of studying methodologies that define and solve various problems handled in the field of artificial intelligence. The machine learning is also defined as an algorithm that enhances performance for a certain operation through a steady experience with respect to the operation.

The term "artificial neural network (ANN)" may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The artificial intelligence may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

The term "autonomous driving (or self-driving)" refers to a technology in which a vehicle drives autonomously, and the term "autonomous vehicle" refers to a vehicle that travels without a user's operation or with a user's minimum operation.

For example, autonomous driving may include all of the technology of maintaining the lane in which a vehicle is driving, the technology of automatically adjusting a vehicle speed such as adaptive cruise control, the technology of causing a vehicle to automatically drive along a given route, and the technology of automatically setting a route, along which a vehicle drives, when a destination is set.

The vehicle may include all of a vehicle having only an internal combustion engine, a hybrid vehicle having both an internal combustion engine and an electric motor, and an electric vehicle having only an electric motor, and may include not only an automobile but also a train and a motorcycle, for example.

At this time, the autonomous vehicle may be seen as a robot having an autonomous driving function.

The term "extended reality" (XR) is a generic term for virtual reality (VR), augmented reality (AR), and mixed reality (MR). The VR technology provides only a CG image of a real-world object or background, for example, the AR technology provides a virtual CG image over an actual object image, and the MR technology is a computer graphic technology of providing an image obtained by mixing and combining virtual objects with the real world.

The MR technology is similar to the AR technology in that it shows a real object and a virtual object together. However, the virtual object is used to complement the real object in the AR technology, whereas the virtual object and the real object are equally used in the MR technology.

The XR technology may be applied to a head-mounted display (HMD), a head-up display (HUD), a mobile phone, a tablet PC, a laptop computer, a desktop computer, a TV, and a digital signage, for example, and a device to which the XR technology is applied may be referred to as an XR device.

Hereinafter, various embodiments of the present disclosure will be described with reference to the drawings.

FIG. 1 illustrates the situation in which a mobile robot 100 enters a moving walkway 150 according to an embodiment.

According to an embodiment, mobile robot 100 is a self-moving device and is movable along a path set by a predetermined function. According to an embodiment, mobile robot 100 may include a drive unit such as a wheel and may be moved by the drive unit. Mobile robot 100 may set an optimal movement path thereof under the assumption that mobile robot 100 may utilize a transport device such as moving walkway 150 when moving along the path. Due to the fact that a step belt of moving walkway 150 continuously moves to horizontally move an object thereon, however, a passenger who attempts to ride on moving walkway 150 may experience the difference in relative speed with moving walkway 150. Such difference in relative speed may cause the passenger or mobile robot 100 to lose the balance thereof when riding on the step belt of moving walkway 150. Therefore, it may be necessary to appropriately control the speed of movement of mobile robot 100 to allow mobile robot 100 to stably ride on the step belt of moving walkway 150.

Figure 2:
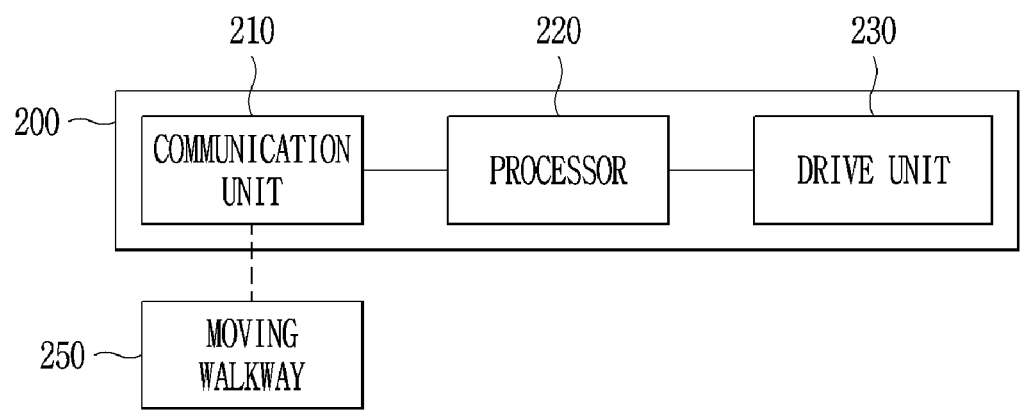
FIG. 2 illustrates a block diagram of a mobile robot for riding on a moving walkway according to an embodiment.

FIG. 2 illustrates a block diagram of a mobile robot 200 for riding on a moving walkway 250 according to an embodiment.

According to an embodiment, mobile robot 200 may include a communication unit 210 capable of performing communication with moving walkway 250, a processor 220 configured to control mobile robot 200 to realize various operations which may be performed by mobile robot 200 according to the following various embodiments, and a drive unit 230 capable of moving mobile robot 200.

According to an embodiment, mobile robot 200 may receive predetermined information indicating the current state of moving walkway 250 (for example, the current speed of the step belt of moving walkway 250, whether or not a passenger is on moving walkway 250, whether or not moving walkway 250 is currently operating, or the load currently applied to moving walkway 250) by communicating with moving walkway 250 through communication unit 210. According to an embodiment, communication unit 210 may be controlled by processor 220 to transmit predetermined information or instructions from mobile robot 200 to moving walkway 250, so that an operation of moving walkway 250 may be controlled in association with mobile robot 200. According to an embodiment, a communication technology available to communication unit 210 may be any of various communication technologies which can be used by those of ordinary skill, and may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

According to an embodiment, processor 220 may control the direction in which mobile robot 200 moves and the speed of movement of mobile robot 200 by controlling drive unit 230. According to an embodiment, drive unit 230 may include components capable of imparting movement to mobile robot 200 such as a wheel and a motor within a range in which they may be easily adopted by those of ordinary skill.

According to an embodiment, the speed of mobile robot 200 may be faster or slower than the speed of the step belt of moving walkway 250. For convenience, the following description of various embodiments will be made under the assumption that the speed of mobile robot 200 is faster than the speed of the step belt of moving walkway 250, but the relationship between the speed of mobile robot 200 and the speed of the step belt of moving walkway 250 should not be interpreted as being limited to the following description.

Hereinafter, various operations which may be performed by mobile robot 200 using communication unit 210 and processor 220 will be described according to various embodiments.

Figure 3:
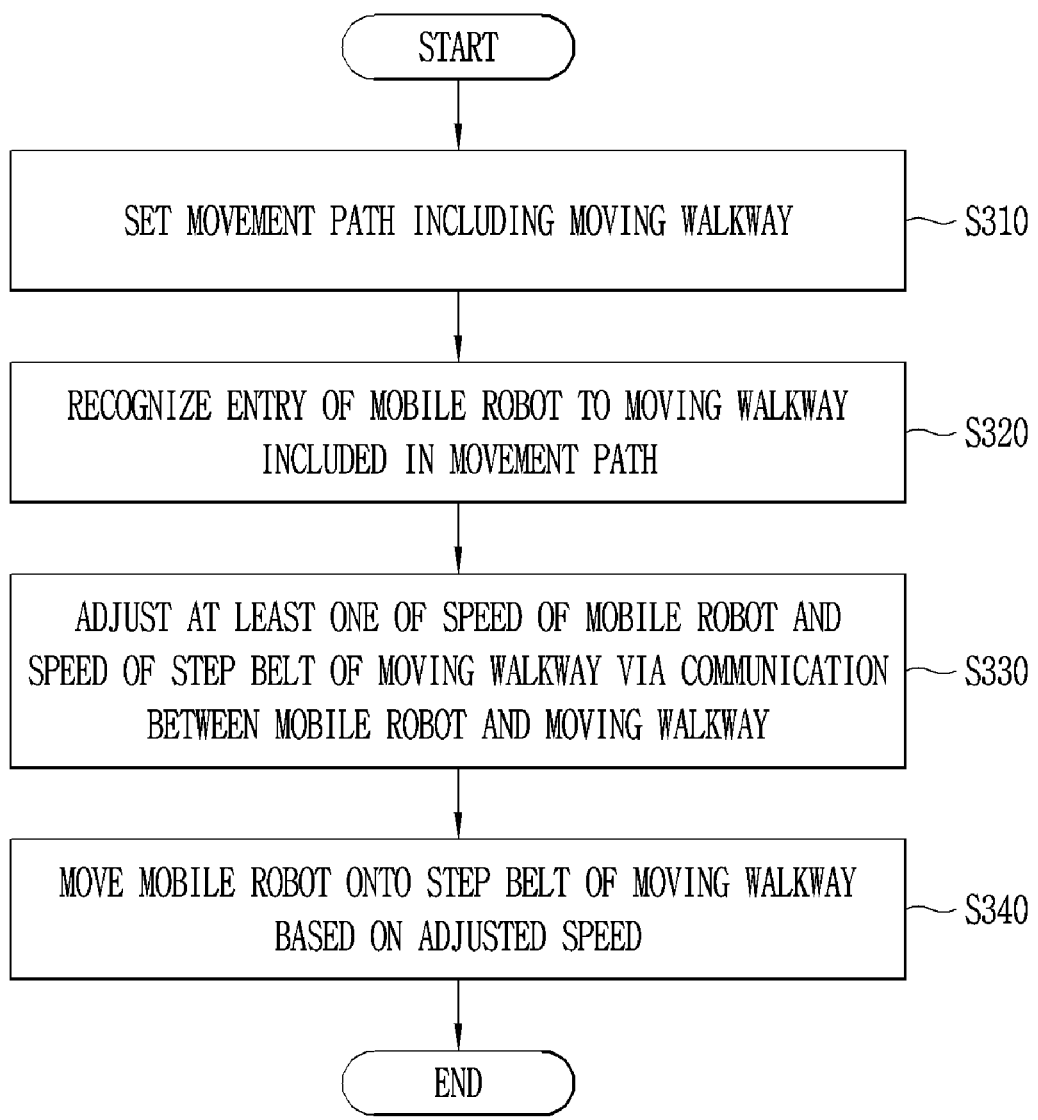
FIG. 3 illustrates a flowchart of a method of causing a mobile robot to enter a moving walkway according to an embodiment.

FIG. 3 illustrates a flowchart of a method of causing mobile robot 200 to enter moving walkway 250 according to an embodiment.

In step S310, mobile robot 200 may set a movement path including moving walkway 250 according to an embodiment. According to an embodiment, processor 220 of mobile robot 200 may set a predetermined movement path using a variety of algorithms (for example, a Dijkstra algorithm) available to those of ordinary skill, and may calculate the weight of each movement path in consideration of various devices, for example, provided in the movement path. According to an embodiment, mobile robot 200 may calculate the weight of a movement path in consideration of an available transport device (for example, moving walkway 250) included in the path, and based on the calculation of the weight, may determine a movement path under the assumption that mobile robot 200 uses the available transport device. In this way, mobile robot 200 may provide a user with an optimal movement path in consideration of the use of a transport device conveniently available to the user.

In step S320, mobile robot 200 may recognize that mobile robot 200 enters moving walkway 250 included in the movement path set in step S310 according to an embodiment.

According to an embodiment, moving walkway 250 may include a continuously moving step belt, and a predetermined entry space for movement of mobile robot 200 may be provided in front of the step belt. As such, mobile robot 200 may recognize that mobile robot 200 enters moving walkway 250 before moving onto the step belt, and based on the recognized result, may additionally perform a predetermined operation required for entry thereof to moving walkway 250.

According to an embodiment, "entry" of mobile robot 200 to moving walkway 250 refers to that mobile robot 200 reaches within a predetermined distance range from the step belt of moving walkway 250 in the process of moving along a path including moving walkway 250, or refers to that mobile robot 200 moves toward the step belt after transmitting predetermined information to moving walkway 250 by passing through a predetermined structure (for example, a predetermined sensor) provided on moving walkway 250.

In step S330, according to an embodiment, mobile robot 200 may adjust at least one of the speed of mobile robot 200 and the speed of the step belt of moving walkway 250 by communicating with moving walkway 250.

According to an embodiment, processor 220 of mobile robot 200 may control communication unit 210 to communicate with moving walkway 250. Processor 220 may receive predetermined information from moving walkway 250 through communication unit 210, and may determine the degree to which at least one of the speed of mobile robot 200 and the speed of the step belt of moving walkway 250 is adjusted based on the received information.

In step S340, mobile robot 200 may move onto the step belt of moving walkway 250 based on the speed adjusted in step S330.

According to an embodiment, processor 220 of mobile robot 200 may control at least one of the speed of mobile robot 200 and the speed of the step belt of moving walkway 250 to allow mobile robot 200 to enter the step belt of moving walkway 250 in the state in which the speed of mobile robot 200 matches the speed of the step belt of moving walkway 250.

In order to control the speed of mobile robot 200 according to an embodiment, processor 220 may control drive unit 230 to reduce or increase the speed of mobile robot 200 to a predetermined speed. In order to control the speed of the step belt of moving walkway 250 according to an embodiment, processor 220 may control communication unit 210 to transmit predetermined information or instructions required to reduce the speed of the step belt of moving walkway 250 to a specific speed. When it is determined to adjust both the speed of mobile robot 200 and the speed of the step belt of moving walkway 250 according to an embodiment, mobile robot 200 may perform both the above-described speed adjustment process using drive unit 230 and the above-described communication process with moving walkway 250.

Figure 4:
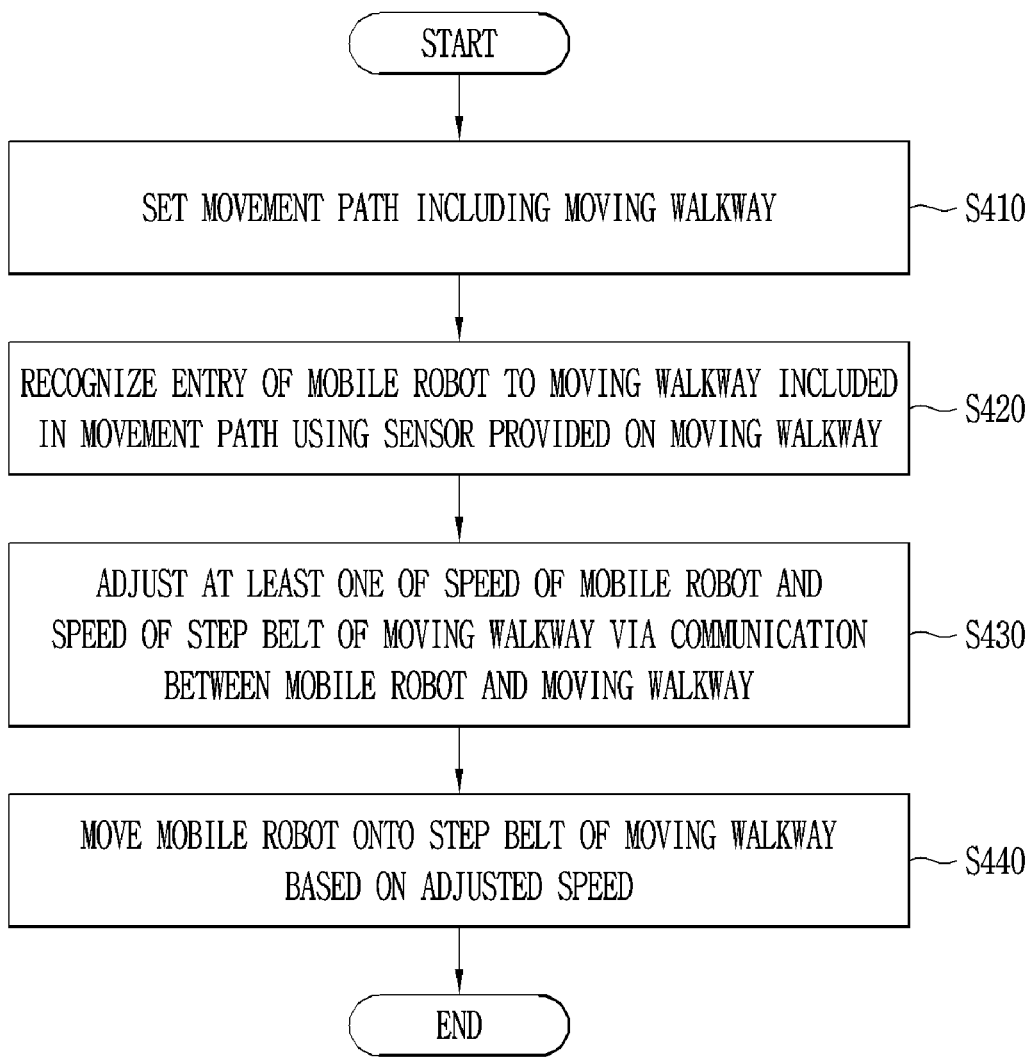
FIG. 4 is a flowchart illustrating a method of causing a mobile robot to enter a moving walkway through a process of the mobile robot recognizing entry thereof to the moving walkway using a sensor provided on the moving walkway according to an embodiment.

FIG. 4 is a flowchart illustrating a method of causing mobile robot 200 to enter moving walkway 250 through a process of mobile robot 200 recognizing entry thereof to moving walkway 250 using a sensor provided on moving walkway 250 according to an embodiment.

The features of steps S410, S430 and S440 may be the same as or similar to those of steps S310, S330 and S340 of FIG. 3, and thus, a detailed description thereof will be omitted.

In step S420, according to an embodiment, mobile robot 200 may recognize that mobile robot 200 enters moving walkway 250 included in the movement path via a sensor provided on moving walkway 250.

According to an embodiment, mobile robot 200 may recognize that mobile robot 200 enters moving walkway 250 using predetermined information transmitted through a predetermined sensor included in moving walkway 250. According to an embodiment, in order to recognize moving walkway 250 included in the movement path and determine whether or not mobile robot 200 enters moving walkway 250, mobile robot 200 may receive predetermined information from a sensor included in moving walkway 250 through communication unit 210. According to an embodiment, the predetermined information received from moving walkway 250 may include information indicating an entrance portion of moving walkway 250. The predetermined information received from moving walkway 250 may further include identification information indicating moving walkway 250.

Figure 5:
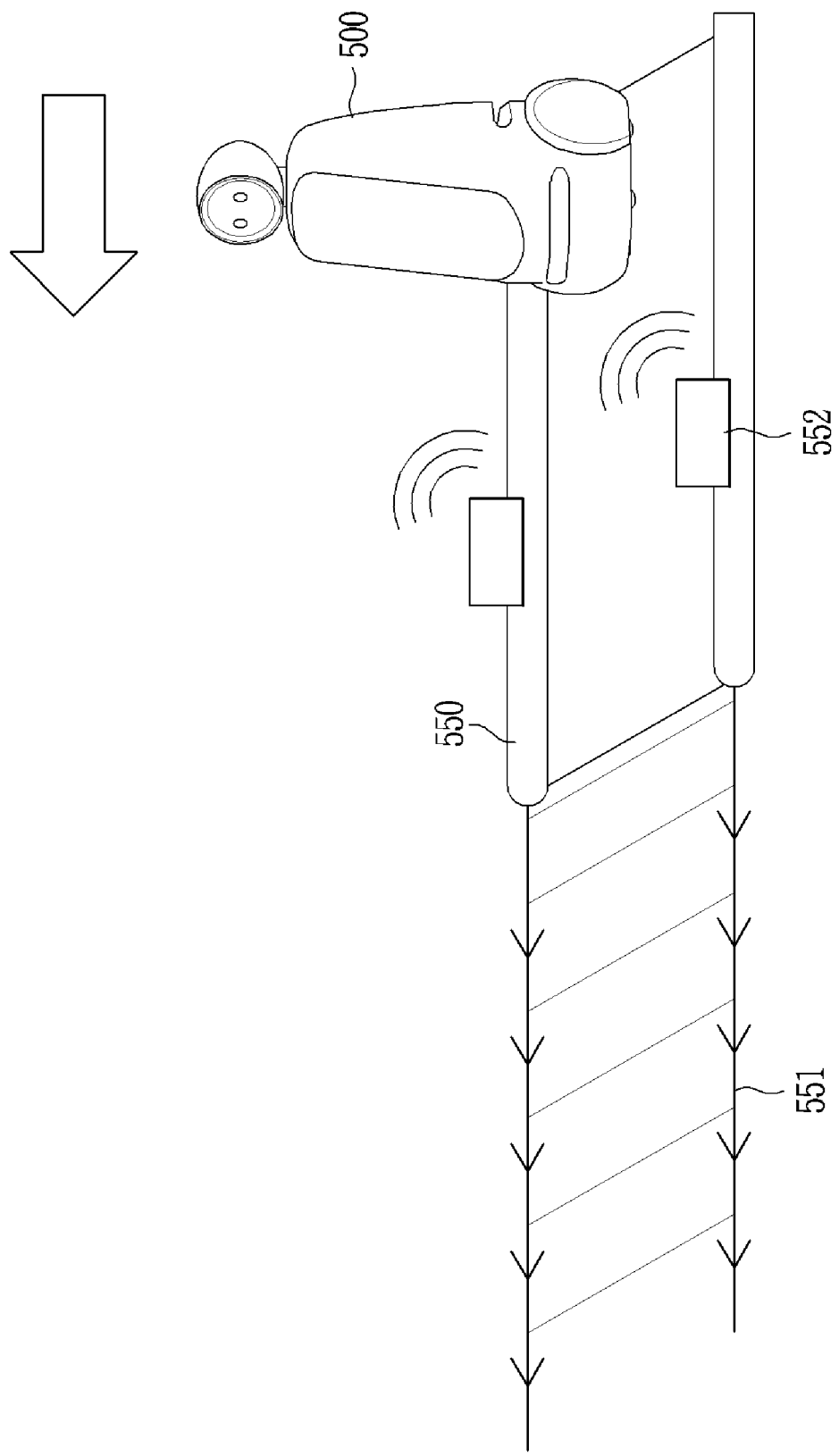
FIG. 5 is a diagram of a mobile robot passing through a sensor provided on a moving walkway according to an embodiment.

FIG. 5 is a diagram of a mobile robot 500 passing through a sensor 552 provided on a moving walkway 550 according to an embodiment.

According to an embodiment, mobile robot 500 may receive predetermined information by passing through at least one sensor 552 provided on moving walkway 550. According to an embodiment, mobile robot 500 may pass through at least one sensor 552 prior to moving to a step belt 551. Mobile robot 500 may recognize that mobile robot 500 enters moving walkway 550 based on the predetermined information received from at least one sensor 552.

According to an embodiment, in order to recognize that mobile robot 200 enters moving walkway 250, mobile robot 200 may use information on the current position of mobile robot 200. That is, communication unit 210 of mobile robot 200 may acquire information indicating the current position of mobile robot 200 such as GPS information, and processor 220 may recognize whether or not mobile robot 200 enters moving walkway 250 by comparing the current position of mobile robot 200 with the position of moving walkway 250 included in the movement path. According to an embodiment, mobile robot 200 may acquire in advance positional information of moving walkway 250 that mobile robot 200 tries to enter. According to an embodiment, when it is difficult to obtain GPS information, for example, since mobile robot 200 is moving in a room, mobile robot 200 may acquire predetermined information such as an NFC tag through a component such as an input unit (not illustrated) to determine the current position thereof.

According to an embodiment, mobile robot 200 may determine whether or not a passenger is present on moving walkway 250, and may adjust at least one of the speed of mobile robot 200 and the speed of the step belt of moving walkway 250 based on the determined result.

According to an embodiment, the speed of mobile robot 200 may be adjusted so as to match the speed of the step belt of moving walkway 250 when a passenger is present on the step belt of moving walkway 250 that mobile robot 200 enters. When the speed of the step belt of moving walkway 250 is faster than the speed of mobile robot 200 according to an embodiment, processor 220 may control drive unit 230 to increase the speed of mobile robot 200 to the speed of the step belt of moving walkway 250. When the speed of the step belt of moving walkway 250 is slower than the speed of mobile robot 200 according to an embodiment, processor 220 may control drive unit 230 to reduce the speed of mobile robot 200 to the speed of the step belt of moving walkway 250. When a passenger is present on the step belt of moving walkway 250, increasing or reducing the speed of moving walkway 250 based on the entry of mobile robot 200 thereto may cause the passenger to lose the balance thereof or feel uncomfortable. Therefore, when a passenger is present on the step belt of moving walkway 250, the speed of mobile robot 200 may be adjusted, instead of adjusting the speed of the step belt of moving walkway 250.

According to an embodiment, when no passenger is present on the step belt of moving walkway 250 that mobile robot 200 enters, the speed of the step belt of moving walkway 250 may be adjusted so as to match the speed of mobile robot 200. When the speed of the step belt of moving walkway 250 is faster than the speed of mobile robot 200 according to an embodiment, processor 220 may control communication unit 210 to transmit, to moving walkway 250, predetermined information or instructions indicating that it is necessary to reduce the speed of the step belt of moving walkway 250 to the speed of mobile robot 200. When the speed of the step belt of moving walkway 250 is slower than the speed of mobile robot 200 according to an embodiment, processor 220 may control communication unit 210 to transmit, to moving walkway 250, predetermined information or instructions indicating that it is necessary to increase the speed of the step belt of moving walkway 250 to the speed of mobile robot 200.

According to an embodiment, mobile robot 200 may receive information indicating that a passenger is present on the step belt of moving walkway 250 through communication unit 210, and processor 220 may determine that a passenger is present on the step belt of moving walkway 250 based on the received information. According to an embodiment, the information indicating whether or not a passenger is present on the step belt of moving walkway 250 may include the magnitude of load applied to moving walkway 250, an image such as a virtual image or a thermal image acquired through, for example, an input unit provided on moving walkway 250, or information, obtained through at least one sensor provided on moving walkway 250, indicating whether or not a passenger has still remained on the step belt.

According to an embodiment, mobile robot 200 may use an input unit (not illustrated) included therein in order to determine whether or not a passenger is present on the step belt of moving walkway 250. That is, mobile robot 200 may determine whether or not a passenger is present on the step belt of moving walkway 250 based on, for example, a virtual image or a thermal image acquired from the input unit (not illustrated).

Figure 6:
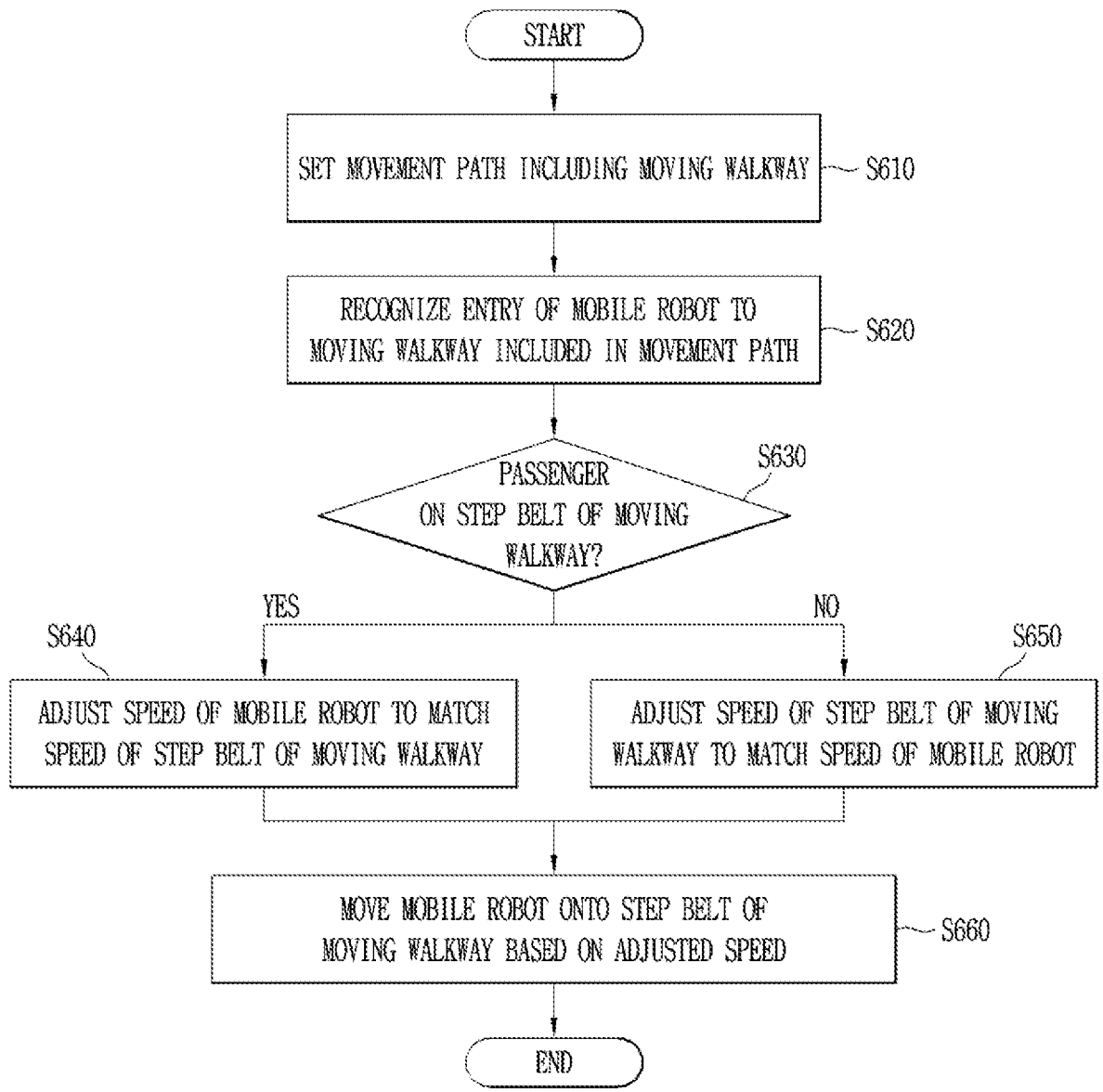
FIG. 6 is a flowchart illustrating a method of controlling, by a mobile robot, at least one of the speed of a step belt of a moving walkway and the speed of the mobile robot based on whether or not a passenger is present on the step belt of the moving walkway according to an embodiment.

FIG. 6 is a flowchart illustrating a method of controlling, by mobile robot 200, at least one of the speed of the step belt of moving walkway 250 and the speed of mobile robot 200 based on whether or not a passenger is present on the step belt of moving walkway 250 according to an embodiment.

The features of steps S610, S620, and S660 may be the same as or similar to those of steps S410, S420, and S440 of FIG. 4, respectively, and thus, a detailed description thereof will be omitted.

In step S630, mobile robot 200 may determine whether or not a passenger is present on the step belt of moving walkway 250 according to an embodiment.

When a passenger is present on the step belt of moving walkway 250 according to an embodiment, mobile robot 200 may adjust the speed thereof so as to match the speed of the step belt of moving walkway 250 in step S640.

When no passenger is present on the step belt of moving walkway 250 according to an embodiment, mobile robot 200 may adjust the speed of the step belt of moving walkway 250 so as to match the speed of mobile robot 200 in step S650. According to an embodiment, processor 220 may control communication unit 210 to transmit, to moving walkway 250, information indicating a target speed to which the speed of the step belt of moving walkway 250 is adjusted. The information indicating the target speed to be transmitted to moving walkway 250 according to an embodiment may indicate the current speed of mobile robot 200.

According to an embodiment, mobile robot 200 may adjust the adjustment ratio between the speed of mobile robot 200 and the speed of the step belt of moving walkway 250 based on whether or not a passenger is present on the step belt of moving walkway 250. For example, when no passenger is present on the step belt of moving walkway 250, in order to match the speed of the step belt of moving walkway 250 with the speed of mobile robot 200, the speed of the step belt of moving walkway 250 may be adjusted at a larger ratio than the speed of mobile robot 200. When a passenger is present on the step belt of moving walkway 250, in order to match the speed of mobile robot 200 with the speed of the step belt of moving walkway 250, the speed of mobile robot 200 may be adjusted at a larger ratio than the speed of the step belt of moving walkway 250.

According to an embodiment, mobile robot 200 may adjust at least one of the speed of mobile robot 200 and the speed of the step belt of moving walkway 250 during a time interval from the time when mobile robot 200 recognizes that mobile robot 200 enters moving walkway 250 to the time when mobile robot 200 moves onto the step belt of moving walkway 250.

Figure 7:
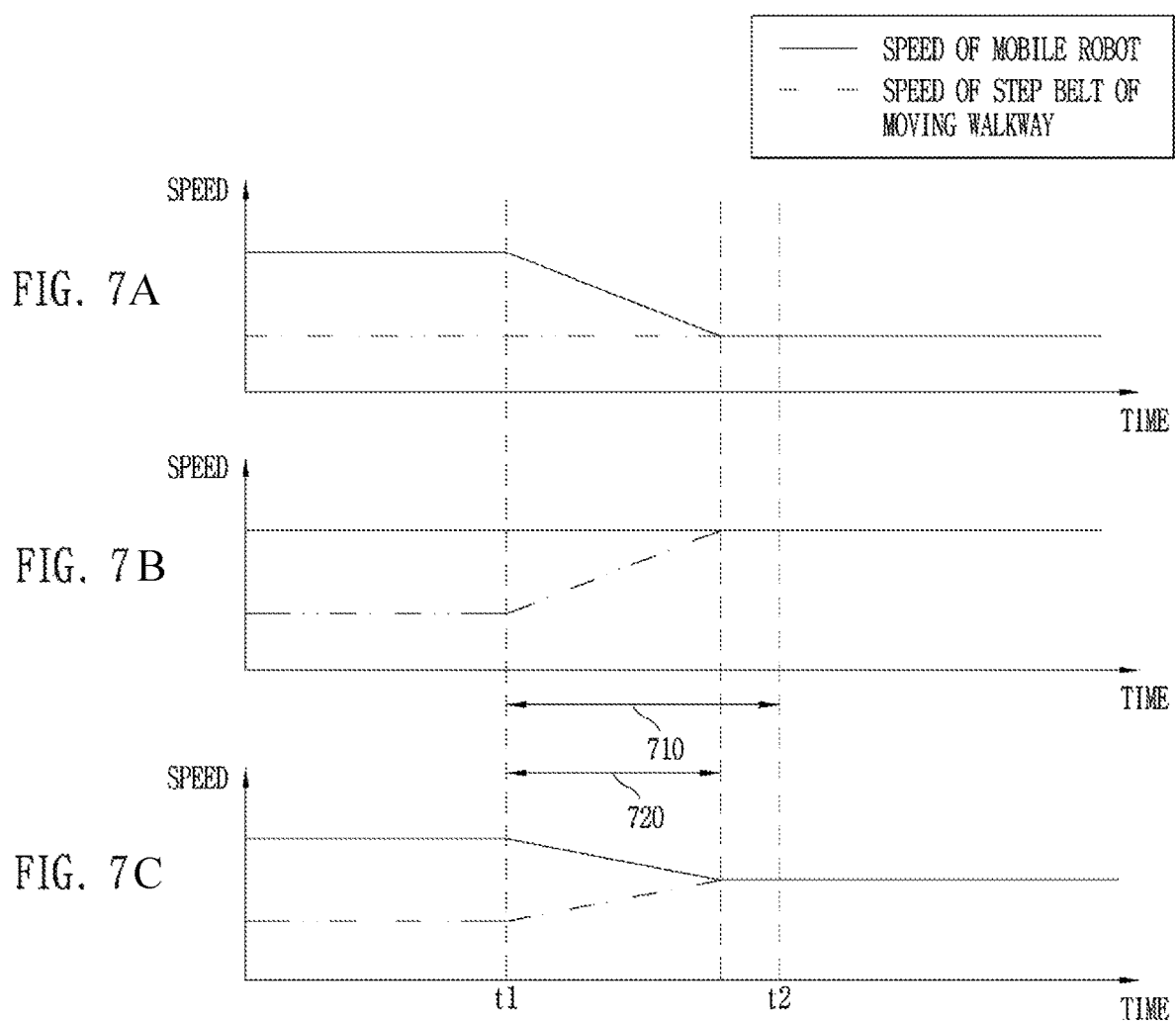
FIGS. 7A to 7C illustrate examples of adjusting at least one of the speed of a mobile robot and the speed of a step belt of a moving walkway during a time interval from the time when the mobile robot recognizes entry thereof to the moving walkway to the time when the mobile robot moves to the step belt of the moving walkway according to an embodiment.

FIGS. 7A to 7C illustrate examples of adjusting at least one of the speed of mobile robot 200 and the speed of the step belt of moving walkway 250 during a time interval from the time when mobile robot 200 recognizes entry thereof to moving walkway 250 to the time when mobile robot 200 moves to the step belt of moving walkway 250 according to an embodiment.

Referring to FIGS. 7A to 7C, there may be a time interval 710 between the time t1 when mobile robot 200 recognizes that mobile robot 200 enters moving walkway 250 and the time t2 when mobile robot 200 moves onto the step belt of moving walkway 250, and at least one of the speed of mobile robot 200 and the speed of the step belt of moving walkway 250 may be adjusted during time interval 710. The speed of mobile robot 200 and the speed of the step belt of moving walkway 250 become match each other according to the result adjusted during time interval 710. According to an embodiment, a time interval 720 during which the speed of mobile robot 200 and the speed of the step belt of moving walkway 250 are substantially adjusted by mobile robot 200 may be determined to be shorter than time interval 710 between time t1 and time t2.

Referring to FIG. 7A, processor 220 of mobile robot 200 may control drive unit 230 to adjust the speed of mobile robot 200 during time interval 720. According to an embodiment, the speed of the step belt of moving walkway 250 may not be changed during time interval 720. FIG. 7A illustrates the result based on a control operation of mobile robot 200 when it is determined that a passenger is present on the step belt of moving walkway 250 according to an embodiment.

Referring to FIG. 7B, processor 220 of mobile robot 200 may control communication unit 210 to transmit, to moving walkway 250, predetermined information or instructions for adjusting the speed of the step belt of moving walkway 250 during time interval 720. According to an embodiment, the speed of mobile robot 200 may not be changed during time interval 720. FIG. 7B illustrates the result based on a control operation of mobile robot 200 when it is determined that no passenger is present on the step belt of moving walkway 250 according to an embodiment.

Referring to FIG. 7C, processor 220 of mobile robot 200 may control drive unit 230 to adjust the speed of mobile robot 200 during time interval 720, and may further control communication unit 210 to transmit, to moving walkway 250, predetermined information or instructions for adjusting the speed of the step belt of moving walkway 250. That is, not only the speed of mobile robot 200 but also the speed of the step belt of moving walkway 250 may be controlled during time interval 710 before mobile robot 200 moves onto the step belt of moving walkway 250. According to an embodiment, the time taken to adjust the speed of mobile robot 200 and the time taken to adjust the speed of the step belt of moving walkway 250 may be different from each other, and may be shorter than time interval 710.

Figure 8:
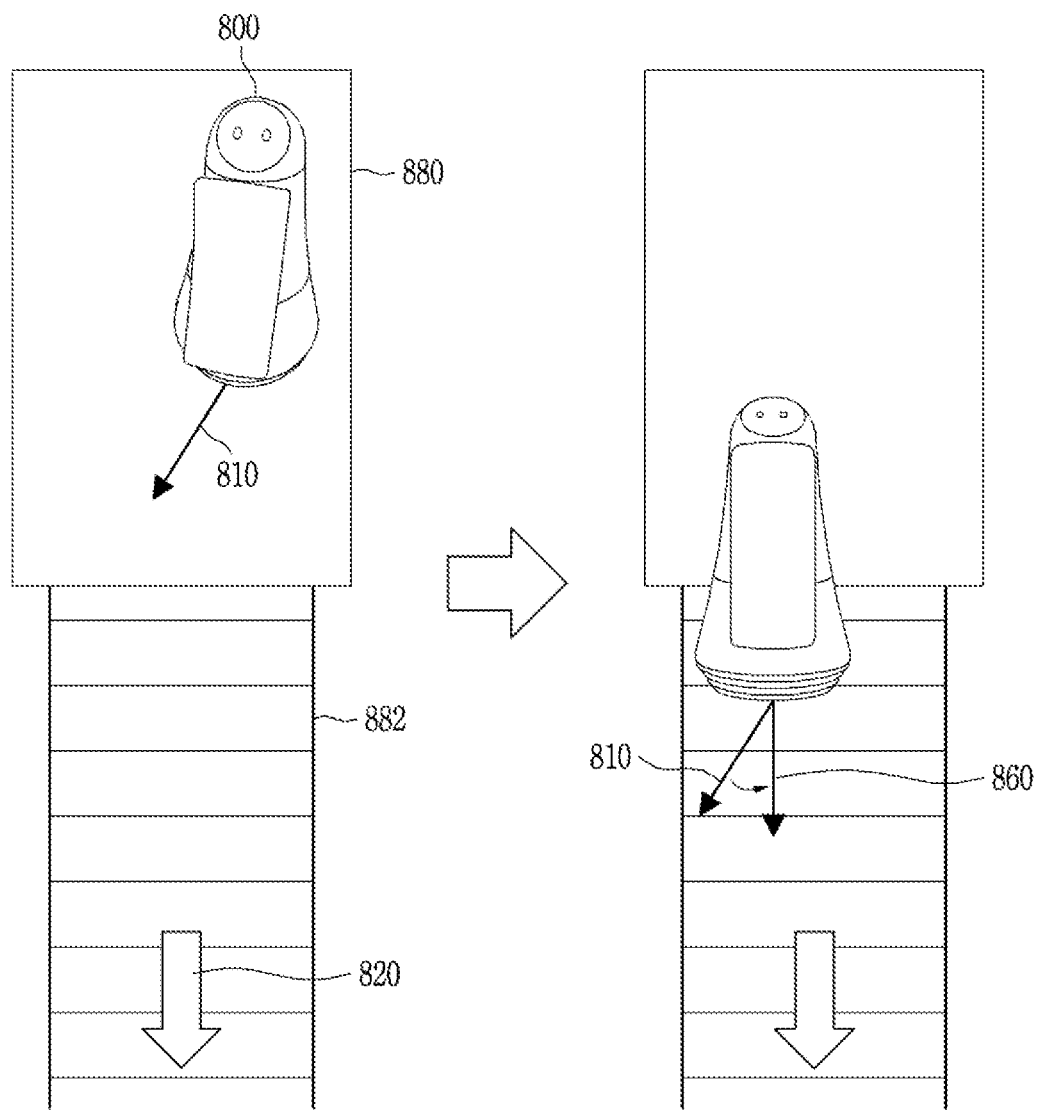
FIG. 8 is a diagram illustrating an operation of a mobile robot when the mobile robot moves to a step belt of a moving walkway according to an embodiment.

FIG. 8 is a diagram illustrating an operation of a mobile robot 800 when mobile robot 800 moves to a step belt 882 of a moving walkway 880 according to an embodiment.

According to an embodiment, mobile robot 800 may move onto step belt 882, which continuously moves, after entering moving walkway 880. According to an embodiment, mobile robot 800 may be oriented at any of various angles at the time when mobile robot 800 moves onto step belt 882 according to a direction 810 in which mobile robot 800 enters moving walkway 880.

According to an embodiment, direction 810 in which mobile robot 800 enters moving walkway 880 may be the direction in which mobile robot 800 moves, and may be related to the direction in which multiple wheels included in drive unit 230 of mobile robot 800 are arranged. For example, entry direction 810 may be perpendicular to the direction in which the wheels of drive unit 230 of mobile robot 800 are arranged.

According to an embodiment, mobile robot 800 may enter step belt 882 in the process of moving in a direction not parallel to a movement direction 820 of step belt 882. According to an embodiment, it may be determined whether or not mobile robot 800 is disposed parallel to movement direction 820 of step belt 882. Various methods may be used to determine whether or not mobile robot 800 is aligned with movement direction 820 of step belt 882 according to an embodiment. For example, processor 220 may analyze an image obtained from an input unit (not illustrated) included in mobile robot 800 to analyze, for example, the difference between acquired movement direction 820 of step belt 882 and direction 810 in which mobile robot 800 is currently oriented or a change in the amount of impact detected at the time when the wheels of drive unit 230 are positioned on step belt 882, thereby determining whether or not mobile robot 800 is aligned with movement direction 820 of step belt 882.

According to an embodiment, when it is determined that mobile robot 800 is not aligned with movement direction 820 of step belt 882, processor 220 may control drive unit 230 to change the orientation of mobile robot 800 so that mobile robot 800 which has entered step belt 882 in direction 810 moves in the same direction 860 as movement direction 820 of step belt 882. In this way, by correcting the orientation of mobile robot 800 so that mobile robot 800 moves in the same direction 860 as movement direction 820 of step belt 882, mobile robot 800 may stably escape moving walkway 880 while maintaining the balance thereof when passing over, for example, a raised spot on the edge of step belt 882.

According to an embodiment, when it may be determined that direction 810 in which mobile robot 800 enters step belt 882 before moving onto step belt 882 is not parallel to movement direction 820 of step belt 882, processor 220 of mobile robot 800 may control drive unit 230 at an arbitrary time between the time when it is determined that direction 810 in which mobile robot 800 enters step belt 882 is not parallel to movement direction 820 of step belt 882 and time t1 when mobile robot 800 moves onto step belt 882 to change the orientation of mobile robot 800 so that mobile robot 800 moves in the same direction 860 as movement direction 820 of step belt 882. In this case, mobile robot 800 may stably enter step belt 882 while maintaining the balance thereof.

Figure 9:
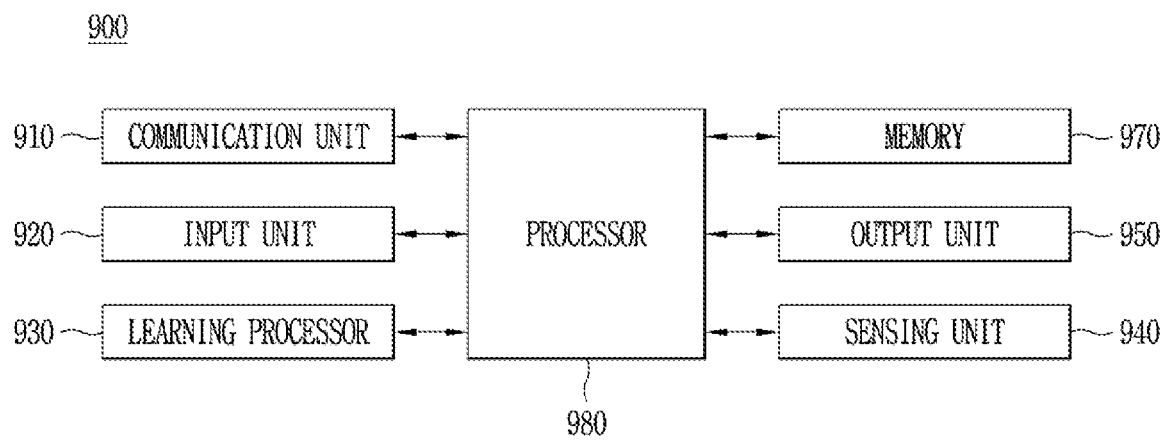
FIG. 9 illustrates an AI device according to an embodiment.

FIG. 9 illustrates an AI device 900 according to an embodiment of the present disclosure.

AI device 900 of FIG. 9 may correspond to mobile robot 200 of FIG. 2, and some of constituent elements of FIG. 9, which are not included in robot 200 of FIG. 2, may be selectively adopted within a range in which the embodiments of the present disclosure may be realized.

AI device 900 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 9, AI device 900 may include a communication unit 910, an input unit 920, a learning processor 930, a sensing unit 940, an output unit 950, a memory 970, and a processor 980, for example.

Communication unit 910 may transmit and receive data to and from external devices, such as other AI devices 1100a to 1100e and an AI server 1000, using wired/wireless communication technologies. For example, communication unit 910 may transmit and receive sensor information, user input, learning models, and control signals, for example, to and from external devices.

At this time, the communication technology used by communication unit 910 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 920 may acquire various types of data.

At this time, input unit 920 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 920 may acquire, for example, input data to be used when acquiring an output using learning data for model learning and a learning model. Input unit 920 may acquire unprocessed input data, and in this case, processor 980 or learning processor 930 may extract an input feature as pre-processing for the input data.

Learning processor 930 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 930 may perform AI processing along with a learning processor 1040 of AI server 1000.

At this time, learning processor 930 may include a memory integrated or embodied in AI device 900. Alternatively, learning processor 930 may be realized using memory 970, an external memory directly coupled to AI device 900, or a memory held in an external device.

Sensing unit 940 may acquire at least one of internal information of AI device 900, environmental information around AI device 900, and user information using various sensors.

At this time, the sensors included in sensing unit 940 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

Output unit 950 may generate, for example, a visual output, an auditory output, or a tactile output.

At this time, output unit 950 may include, for example, a display that outputs visual information, a speaker that outputs auditory information, and a haptic module that outputs tactile information.

Memory 970 may store data which assists various functions of AI device 900. For example, memory 970 may store input data acquired by input unit 920, learning data, learning models, and learning history, for example.

Processor 980 may determine at least one executable operation of AI device 900 based on information determined or generated using a data analysis algorithm or a machine learning algorithm. Then, processor 980 may control constituent elements of AI device 900 to perform the determined operation.

To this end, processor 980 may request, search, receive, or utilize data of learning processor 930 or memory 970, and may control the constituent elements of AI device 900 so as to execute a predictable operation or an operation that is deemed desirable among the at least one executable operation.

At this time, when connection of an external device is required to perform the determined operation, processor 980 may generate a control signal for controlling the external device and may transmit the generated control signal to the external device.

Processor 980 may acquire intention information with respect to user input and may determine a user request based on the acquired intention information.

At this time, processor 980 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 930, may have learned by learning processor 1040 of AI server 1000, or may have learned by distributed processing of these processors.

Processor 980 may collect history information including, for example, the content of an operation of AI device 900 or feedback of the user with respect to an operation, and may store the collected information in memory 970 or learning processor 930, or may transmit the collected information to an external device such as AI server 1000. The collected history information may be used to update a learning model.

Processor 980 may control at least some of the constituent elements of AI device 900 in order to drive an application program stored in memory 970. Moreover, processor 980 may combine and operate two or more of the constituent elements of AI device 900 for the driving of the application program.

Figure 10:
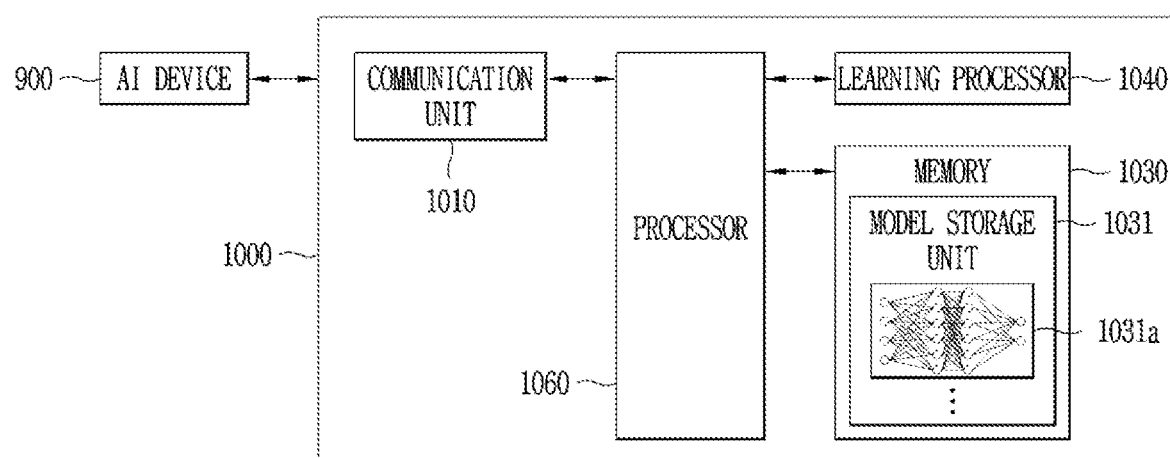
FIG. 10 illustrates an AI server according to an embodiment.

FIG. 10 illustrates AI server 1000 according to an embodiment of the present disclosure.

Referring to FIG. 10, AI server 1000 may refer to a device that causes an artificial neural network to learn using a machine learning algorithm or uses the learned artificial neural network. Here, AI server 1000 may be constituted of multiple servers to perform distributed processing, and may be defined as a 5G network. At this time, AI server 1000 may be included as a constituent element of AI device 900 so as to perform at least a part of AI processing together with the AI device.

AI server 1000 may include a communication unit 1010, a memory 1030, learning processor 1040, and a processor 1060, for example.

Communication unit 1010 may transmit and receive data to and from an external device such as AI device 900.

Memory 1030 may include a model storage unit 1031. Model storage unit 1031 may store a model (or an artificial neural network) 1031*a* which is learning or has learned via learning processor 1040.

Learning processor 1040 may cause artificial neural network 1031*a* to learn learning data. A learning model may be used in the state of being mounted in AI server 1000 of the artificial neural network, or may be used in the state of being mounted in an external device such as AI device 900.

The learning model may be realized in hardware, software, or a combination of hardware and software. In the case in which a part or the entirety of the learning model is realized in software, one or more instructions constituting the learning model may be stored in memory 1030.

Processor 1060 may deduce a result value for newly input data using the learning model, and may generate a response or a control instruction based on the deduced result value.

Figure 11:
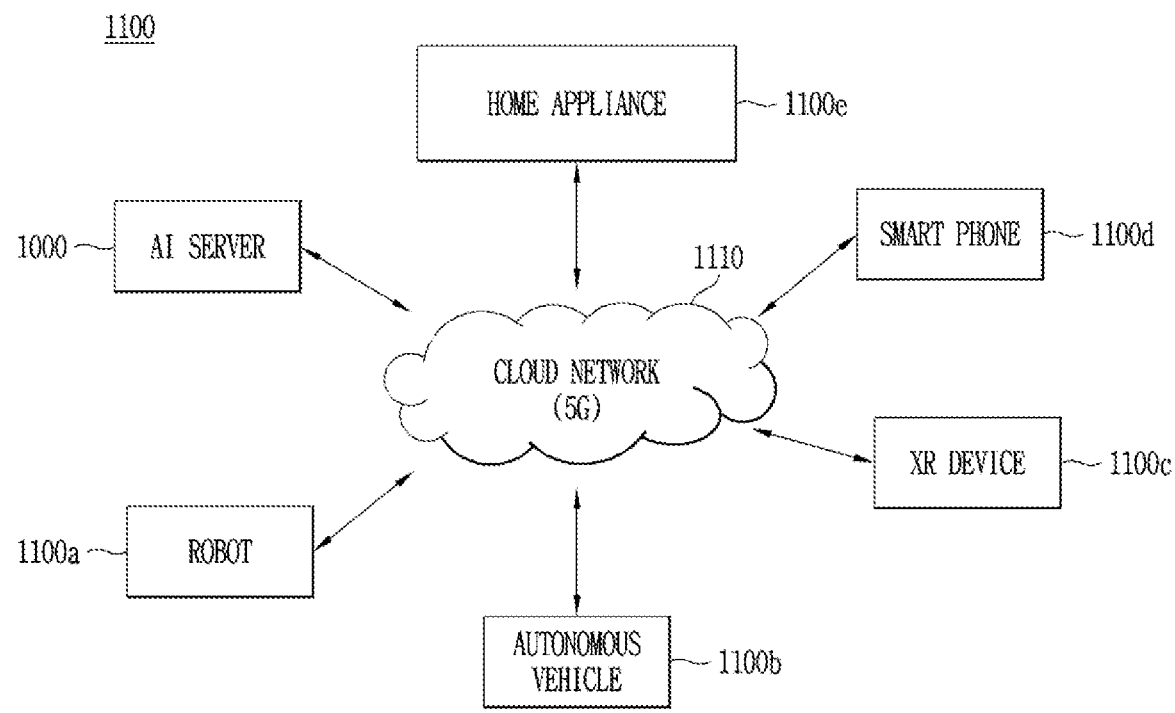
FIG. 11 illustrates an AI system according to an embodiment.

FIG. 11 illustrates an AI system 1100 according to an embodiment of the present disclosure.

Referring to FIG. 11, in AI system 1100, at least one of AI server 1000, a robot 1100*a*, an autonomous vehicle 1100*b*, an XR device 1100*c*, a smart phone 1100*d*, and a home appliance 1100*e* is connected to a cloud network 1110. Here, robot 1100*a*, autonomous vehicle 1100*b*, XR device 1100*c*, smart phone 1100*d*, and home appliance 1100*e*, to which AI technologies are applied, may be referred to as AI devices 1100*a* to 1100*e*.

Cloud network 1110 may constitute a part of a cloud computing infra-structure, or may refer to a network present in the cloud computing infra-structure. Here, cloud network 1110 may be configured using a 3G network, a 4G or long term evolution (LTE) network, or a 5G network, for example.

That is, respective devices 1100*a* to 1100*e* and 1000 constituting AI system 1100 may be connected to each other via cloud network 1110. In particular, respective devices 1100*a* to 1100*e* and 1000 may communicate with each other via a base station, or may perform direct communication without the base station.

AI server 1000 may include a server which performs AI processing and a server which performs an operation with respect to big data.

AI server 1000 may be connected to at least one of robot 1100*a*, autonomous vehicle 1100*b*, XR device 1100*c*, smart phone 1100*d*, and home appliance 1100*e*, which are AI devices constituting AI system 1100, via cloud network 1110, and may assist at least a part of AI processing of connected AI devices 1100*a* to 1100*e*.

At this time, instead of AI devices 1100*a* to 1100*e*, AI server 1000 may cause an artificial neural network to learn according to a machine learning algorithm, and may directly store a learning model or may transmit the learning model to AI devices 1100*a* to 1100*e*.

At this time, AI server 1000 may receive input data from AI devices 1100*a* to 1100*e*, may deduce a result value for the received input data using the learning model, and may generate a response or a control instruction based on the deduced result value to transmit the response or the control instruction to AI devices 1100*a* to 1100*e*.

Alternatively, AI devices 1100*a* to 1100*e* may directly deduce a result value with respect to input data using the learning model, and may generate a response or a control instruction based on the deduced result value.

Hereinafter, various embodiments of AI devices 1100*a* to 1100*e*, to which the above-described technology is applied, will be described. Here, AI devices 1100*a* to 1100*e* illustrated in FIG. 11 may be specific embodiments of AI device 900 illustrated in FIG. 9.

Robot 1100*a* may be realized into a guide robot, a transportation robot, a cleaning robot, a wearable robot, an entertainment robot, a pet robot, or an unmanned flying robot, for example, through the application of AI technologies.

Robot 1100*a* may include a robot control module for controlling an operation, and the robot control module may refer to a software module or a chip realized in hardware.

Robot 1100*a* may acquire information on the state of robot 1100*a* using sensor information acquired from various types of sensors, may detect (recognize) the surrounding environment and an object, may generate map data, may determine a movement route and a driving plan, may determine a response with respect to user intersection, or may determine an operation.

Here, robot 1100*a* may use sensor information acquired from at least one sensor among a lidar, a radar, and a camera in order to determine a movement route and a driving plan.

Robot 1100*a* may perform the above-described operations using a learning model configured with at least one artificial neural network. For example, robot 1100*a* may recognize the surrounding environment and the object using the learning model, and may determine an operation using the recognized surrounding environment information or object information. Here, the learning model may be directly learned in robot 1100*a*, or may be learned in an external device such as AI server 1000.

At this time, robot 1100*a* may directly generate a result using the learning model to perform an operation, but may transmit sensor information to an external device such as AI server 1000 and receive a result generated by the external device to perform an operation.

Robot 1100*a* may determine a movement route and a driving plan using at least one of map data, object information detected from sensor information, and object information acquired from an external device, and a drive unit may be controlled to drive robot 1100*a* according to the determined movement route and driving plan.

The map data may include object identification information for various objects arranged in a space along which robot 1100*a* moves. For example, the map data may include object identification information for stationary objects, such as the wall and the door, and movable objects such as a flowerpot and a desk. Then, the object identification information may include names, types, distances, and locations, for example.

In addition, robot 1100a may perform an operation or may drive by controlling the drive unit based on user control or interaction. At this time, robot 1100a may acquire interactional intention information depending on a user operation or voice expression, and may determine a response based on the acquired intention information to perform an operation.

Autonomous vehicle 1100b may be realized into a mobile robot, a vehicle, or an unmanned air vehicle, for example, through the application of AI technologies.

Autonomous vehicle 1100b may include an autonomous driving control module for controlling an autonomous driving function, and the autonomous driving control module may mean a software module or a chip realized in hardware. The autonomous driving control module may be a constituent element included in autonomous vehicle 1100b, but may be a separate hardware element outside autonomous vehicle 1100b so as to be connected thereto.

Autonomous vehicle 1100b may acquire information on the state of autonomous vehicle 1100b using sensor information acquired from various types of sensors, may detect (recognize) the surrounding environment and an object, may generate map data, may determine a movement route and a driving plan, or may determine an operation.

Here, autonomous vehicle 1100b may use sensor information acquired from at least one sensor among a lidar, a radar, and a camera in the same manner as robot 1100a in order to determine a movement route and a driving plan.

In particular, autonomous vehicle 1100b may recognize the environment or an object with respect to an area outside the field of vision or an area located at a predetermined distance or more by receiving sensor information from external devices, or may directly receive recognized information from external devices.

Autonomous vehicle 1100b may perform the above-described operations using a learning model configured with at least one artificial neural network. For example, autonomous vehicle 1100b may recognize the surrounding environment and the object using the learning model, and may determine a driving line using the recognized surrounding environment information or object information. Here, the learning model may be directly learned in autonomous vehicle 1100b, or may be learned in an external device such as AI server 1000.

At this time, autonomous vehicle 1100b may generate a result using the learning model to perform an operation, but may transmit sensor information to an external device such as AI server 1000 and receive a result generated by the external device to perform an operation.

Autonomous vehicle 1100b may determine a movement route and a driving plan using at least one of map data, object information detected from sensor information, and object information acquired from an external device, and a drive unit may be controlled to drive autonomous vehicle 1100b according to the determined movement route and driving plan.

The map data may include object identification information for various objects arranged in a space (e.g., a road) along which autonomous vehicle 1100b drives. For example, the map data may include object identification information for stationary objects, such as streetlights, rocks, and buildings, and movable objects such as vehicles and pedestrians. Then, the object identification information may include names, types, distances, and locations, for example.

In addition, autonomous vehicle 1100b may perform an operation or may drive by controlling the drive unit based on user control or interaction. At this time, autonomous vehicle 1100b may acquire interactional intention information depending on a user operation or voice expression, and may determine a response based on the acquired intention information to perform an operation.

XR device 1100c may be realized into a head-mount display (HMD), a head-up display (HUD) provided in a vehicle, a television, a cellular phone, a smart phone, a computer, a wearable device, a home appliance, a digital signage, a vehicle, a stationary robot, or a mobile robot, for example, through the application of AI technologies.

XR device 1100c may obtain information on the surrounding space or a real object by analyzing three-dimensional point cloud data or image data acquired from various sensors or an external device to generate positional data and attribute data for three-dimensional points, and may output an XR object by rendering the XR object to be output. For example, XR device 1100c may output an XR object including additional information about a recognized object so as to correspond to the recognized object.

XR device 1100c may perform the above-described operations using a learning model configured with at least one artificial neural network. For example, XR device 1100c may recognize a real object from three-dimensional point cloud data or image data using a learning model, and may provide information corresponding to the recognized real object. Here, the learning model may be directly learned in XR device 1100c, or may be learned in an external device such as AI server 1000.

At this time, XR device 1100c may directly generate a result using the learning model to perform an operation, but may transmit sensor information to an external device such as AI server 1000 and receive the generated result to perform an operation.

Robot 1100a may be realized into a guide robot, a transportation robot, a cleaning robot, a wearable robot, an entertainment robot, a pet robot, or an unmanned flying robot, for example, through the application of AI technologies and autonomous driving technologies.

Robot 1100a to which the AI technologies and the autonomous driving technologies are applied may refer to, for example, a robot having an autonomous driving function, or may refer to robot 1100a which interacts with autonomous vehicle 1100b.

Robot 1100a having an autonomous driving function may collectively refer to devices that move by themselves along a given moving line without user control, or move by determining a moving line by themselves.

Robot 1100a and autonomous vehicle 1100b, which have an autonomous driving function, may use a common sensing method in order to determine at least one of a movement route or a driving plan. For example, robot 1100a and autonomous vehicle 1100b, which have an autonomous driving function, may determine at least one of the movement route or the driving plan using information sensed by a lidar, a radar, and a camera.

Robot 1100a, which interacts with autonomous vehicle 1100b, may be provided separately from autonomous vehicle 1100b so as to be connected to the autonomous driving function of autonomous vehicle 1100b inside or outside autonomous vehicle 1100b, or may perform an operation associated with a user who has got on autonomous vehicle 1100b.

At this time, robot 1100a, which interacts with autonomous vehicle 1100b, may acquire sensor information instead of autonomous vehicle 1100b to provide the information to autonomous vehicle 1100b, or may acquire sensor information and generate surrounding environment information or object information to provide the information to autonomous vehicle 1100b, thereby controlling or assisting the autonomous driving function of autonomous vehicle 1100b.

Alternatively, robot 1100a, which interacts with autonomous vehicle 1100b, may monitor the user who has got on autonomous vehicle 1100b or may control the functions of autonomous vehicle 1100b via interaction with the user. For example, when it is determined that a driver is in a drowsy state, robot 1100a may activate the autonomous driving function of autonomous vehicle 1100b or may assist the control of a drive unit of autonomous vehicle 1100b. Here, the functions of autonomous vehicle 1100b controlled by robot 1100a may include not only the autonomous driving function, but also a function provided in a navigation system or an audio system provided in autonomous vehicle 1100b.

Alternatively, robot 1100a, which interacts with autonomous vehicle 1100b, may provide information to autonomous vehicle 1100b or assist the function thereof at the outside of autonomous vehicle 1100b. For example, robot 1100a may serve as a smart traffic light that provides traffic information including, for example, traffic signal information to autonomous vehicle 1100b, or may serve as an automatic electric charger of an electric vehicle that may interact with autonomous vehicle 1100b and may be automatically connected to a charge port of the vehicle.

Robot 1100a may be realized into a guide robot, a transportation robot, a cleaning robot, a wearable robot, an entertainment robot, a pet robot, an unmanned flying robot, or a drone, for example, through the application of AI technologies and XR technologies.

Robot 1100a, to which the XR technologies are applied, may refer to a robot which is a control or interaction target in an XR image. In this case, robot 1100a may be provided separately from XR deice 1100c and may operate in cooperation with XR device 1100c.

When robot 1100a, which is a control or interaction target in an XR image, acquires sensor information from sensors including a camera, robot 1100a or XR device 1100c may generate an XR image based on the sensor information, and XR device 1100c may output the generated XR image. Then, such robot 1100a may operate based on a control signal input through XR device 1100c or via intersection with the user.

For example, the user may check the XR image corresponding to the viewpoint of robot 1100a, which is remotely linked, via an external device such as XR device 1100c, and may adjust an autonomous driving route of robot 1100a or control an operation or driving thereof via interaction with the robot, or may check information on an object around thereof.

Autonomous vehicle 1100b may be realized into a mobile robot, a vehicle, or an unmanned air vehicle, for example, through the application of the AI technologies and the XR technologies.

Autonomous vehicle 1100b, to which the XR technologies are applied, may refer to an autonomous vehicle having an XR image providing device, or may refer to an autonomous vehicle as a control or interaction target in an XR image, for example. Particularly, autonomous vehicle 1100b as a control or interaction target in an XR image may be provided separately from XR device 1100c and may operate in cooperation with XR device 1100c.

Autonomous vehicle 1100b having the XR image providing device may acquire sensor information from sensors including a camera, and may output an XR image generated based on the acquired sensor information. For example, autonomous vehicle 1100b may include an HUD to output an XR image, thereby providing an occupant with an XR object corresponding to a real object or an object in the screen.

At this time, when the XR object is output to the HUD, at least a portion of the XR object may be output so as to overlap with a real object to which the passenger's gaze is directed. On the other hand, when the XR object is output to a display provided in autonomous vehicle 1100b, at least a portion of the XR object may be output so as to overlap with an object in the screen. For example, autonomous vehicle 1100b may output XR objects corresponding to objects such as a lane, another vehicle, a traffic light, a traffic sign, a two-wheeled vehicle, a pedestrian, and a building.

When autonomous vehicle 1100b as a control or interaction target in an XR image acquires sensor information from sensors including a camera, autonomous vehicle 1100b or XR device 1100c may generate an XR image based on the sensor information, and XR device 1100c may output the generated XR image. Then, autonomous vehicle 1100b may operate based on a control signal input through an external device such as XR device 1100c or via interaction with the user.

The above-described method for the entry of a mobile robot to a moving walkway according to the present disclosure may be provided as a program to be executed in a computer and may be recorded on a computer readable recording medium.

The method for the entry of a mobile robot to a moving walkway according to the present disclosure may be executed via software. When executed via software, the constituent elements of the present disclosure are code segments that execute required operations. The program or the code segments may be stored in a processor readable medium.

The computer readable recording medium includes all kinds of recording devices in which data is stored in a computer readable manner. Examples of the computer readable recording device include a ROM, a RAM, a CD-ROM, a DVD-ROM, a DVD-RAM, a magnetic tape, a floppy disc, a hard disc, and an optical data storage device. In addition, the computer readable recording medium may be distributed in a computer device connected thereto via a network so that a computer readable code may be stored and executed in a distribution manner.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for entering a mobile robot into a moving walkway comprising:
setting a movement path including the moving walkway;
recognizing that the mobile robot enters the moving walkway included in the movement path;

adjusting at least one of a speed of the mobile robot and a speed of a step belt of the moving walkway via communication between the mobile robot and the moving walkway; and moving the mobile robot onto the step belt of the moving walkway based on the adjusted speed, wherein the adjusting includes:

adjusting the at least one of the speed of the mobile robot and the speed of the step belt of the moving walkway based on whether or not a passenger is present on the moving walkway, adjusting the at least one of the speed of the mobile robot and the speed of the step belt of the moving walkway so that the speed of the mobile robot and the speed of the step belt of the moving walkway match each other, and adjusting the speed of the step belt of the moving walkway so as to match the speed of the mobile robot when no passenger is present on the moving walkway.

2. The method of claim 1, wherein the recognizing includes recognizing that the mobile robot enters the moving walkway via a sensor provided on the moving walkway.

3. The method of claim 1, wherein the adjusting further includes:

receiving information indicating whether or not the passenger is present on the moving walkway from the moving walkway; and determining whether or not the passenger is present on the moving walkway based on the received information.

4. The method of claim 1, wherein the adjusting includes adjusting the speed of the mobile robot so as to match the speed of the step belt of the moving walkway when the passenger is present on the moving walkway.

5. The method of claim 1, wherein the adjusting includes adjusting the at least one of the speed of the mobile robot and the speed of the step belt of the moving walkway from a time when it is recognized that the mobile robot enters the moving walkway to a time when the mobile robot moves onto the step belt of the moving walkway.

6. The method of claim 1, wherein the moving further includes adjusting an orientation of the mobile robot so that a movement direction of the mobile robot moved onto the step belt of the moving walkway is parallel to a movement direction of the step belt of the moving walkway.

7. A mobile robot comprising:

a communication unit configured to communicate with a moving walkway; and a processor configured to set a movement path including the moving walkway, to recognize that the mobile robot enters the moving walkway included in the movement path, to adjust at least one of a speed of the mobile robot and a speed of a step belt of the moving walkway via communication between the mobile robot and the moving walkway, and to move the mobile robot onto the step belt of the moving walkway based on the adjusted speed, wherein the processor is configured to:

adjust the at least one of the speed of the mobile robot and the speed of the step belt of the moving walkway based on whether or not a passenger is present on the moving walkway, adjust the at least one of the speed of the mobile robot and the speed of the step belt of the moving walkway so that the speed of the mobile robot and the speed of the step belt of the moving walkway match each other, and adjust the speed of the step belt of the moving walkway so as to match the speed of the mobile robot when no passenger is present on the moving walkway.

8. The mobile robot of claim 7, wherein the processor is configured to recognize that the mobile robot enters the moving walkway via a sensor provided on the moving walkway.

9. The mobile robot of claim 7, wherein the processor is further configured to receive information indicating whether or not the passenger is present on the moving walkway from the moving walkway, and to determine whether or not the passenger is present on the moving walkway based on the received information.

10. The mobile robot of claim 7, wherein the processor is configured to adjust the speed of the mobile robot so as to match the speed of the step belt of the moving walkway when the passenger is present on the moving walkway.

11. The mobile robot of claim 7, wherein the processor is configured to adjust the at least one of the speed of the mobile robot and the speed of the step belt of the moving walkway from a time when it is recognized that the mobile robot enters the moving walkway to a time when the mobile robot moves onto the step belt of the moving walkway.

12. The mobile robot of claim 7, wherein the processor is further configured to adjust an orientation of the mobile robot so that a movement direction of the mobile robot moved onto the step belt of the moving walkway is parallel to a movement direction of the step belt of the moving walkway.

13. A non-transitory computer readable recording medium comprising a computer program for performing the method for entering a mobile robot into a moving walkway of claim 1.

* * * * *